United States Patent [19]
Peters et al.

[11] Patent Number: 5,575,256
[45] Date of Patent: Nov. 19, 1996

[54] THROTTLE VALVE HOUSING FORMED OF MOLDED PLASTIC

[75] Inventors: Klaus-Jürgen Peters, Affalterbach; Karl Gmelin, Flein; Matthias Entenmann, Bietigheim-Bissingen; Peter Ropertz, Möglingen, all of Germany; Herbert Pollmann; Wolfgang Hodulik, both of Karlstein, Austria

[73] Assignee: Robert Bosch GmbH, Stuttgart, Germany

[21] Appl. No.: 403,815

[22] PCT Filed: Oct. 7, 1993

[86] PCT No.: PCT/DE93/00948

§ 371 Date: Apr. 7, 1995

§ 102(e) Date: Apr. 7, 1995

[87] PCT Pub. No.: WO95/02493

PCT Pub. Date: Jan. 26, 1995

[30] Foreign Application Priority Data

Jul. 14, 1993 [AT] Austria ................................ 1391/93

[51] Int. Cl.⁶ ..................................................... F02D 9/08
[52] U.S. Cl. ............................................................. 123/337
[58] Field of Search .................. 123/337; 29/527.1, 29/527.2; 261/DIG. 12, DIG. 36, DIG. 45

[56] References Cited

U.S. PATENT DOCUMENTS

| | | | |
|---|---|---|---|
| 4,356,801 | 11/1982 | Graham | 123/337 |
| 4,561,158 | 12/1985 | Johnson et al. | 29/527.1 |
| 4,909,212 | 3/1990 | Minowa et al. | 123/337 |
| 5,146,887 | 9/1992 | Gluchowski et al. | 123/337 |

*Primary Examiner*—Raymond A. Nelli
*Attorney, Agent, or Firm*—Edwin E. Greigg; Ronald E. Greigg

[57] ABSTRACT

A throttle-valve housing of plastic has a metal insert which achieves dimensional stability in the region of the throttle valve. The throttle-valve housing is formed of plastic with a cavity bounded by an inner wall surface. In the wall there is arranged a metal insert which is covered on all sides by the plastic material and effects a stabilization of the plastic material, so that distorting, shrinking or the like is prevented and dimensional accuracy of the inner wall surface is ensured. The novel throttle-valve housing is simple to produce and has a high dimensional stability in spite of being formed from plastic material. The throttle-valve housing is suitable for internal-combustion engines of motor vehicles.

12 Claims, 2 Drawing Sheets ure of the throttle-valve housing maintains its dimensional stability even when operated for long periods over years, in particular in the region of the so-called idling position of the throttling member, in order to be able to set the required low gap width around the throttling member. It is further disadvantageous that the position and the axial alignment of the bearings for the throttling member also changes, for example due to the temperature fluctuations, which can result in jamming of the throttling member. If used in motor vehicles, jamming can have the effect that the engine speed and travelling speed can no longer be influenced by the driver.

THROTTLE VALVE HOUSING FORMED OF MOLDED PLASTIC

The invention relates to a moulding consisting of plastic, in particular produced by the injection-moulding process, for example a throttle-valve housing, having a wall which with an inner wall surface bounds a cavity.

In the case of many mouldings, there is the requirement that the inner wall surface of the cavity must be dimensionally stable, i.e. must not change its shape and its dimensions. This is necessary, for example, whenever the effective throughflow cross-section of this cavity is to be variable by a throttling member located therein. For example, this is the case with throttle valves, such as are used in air intake pipes of internal combustion engines in motor vehicles. In such valves there is in a cross-section of the cavity, which forms part of the air intake pipe, a disc-shaped throttling member mounted such that it can swivel about a throttle-valve spindle, by the swivelling of which throttling member the throughflow cross-section of the air-intake pipe can be varied from maximum to complete shut-off.

It is already known to form such throttle-valve housings, which form part of the air-intake pipe and receive the throttle valve, from an aluminium moulding. However, such throttle-valve housings are expensive, on the one hand because of the relatively expensive production material, but in particular because of the finishing work required. After producing the blank, the inner wall surface must namely be machined by milling or drilling to achieve the required diameter and must be ground for producing the fitting surfaces. Furthermore, the bearing bores for the throttle-valve spindle of the swivelling disc-shaped throttling member have to be correspondingly machined, and for attaching additional parts, such as, for example an idling-speed governor or potentiometer, the connections to the air-intake pipe and threaded bores have to be cut.

Recently, the air-intake stub located upstream of the throttle-valve housing has often been produced from plastic. If in this case the throttle-valve housing consists of aluminium, relatively heavy in comparison with plastic, undesired vibrations of this throttle-valve housing occur.

It has therefore already been proposed to produce the throttle-valve housing likewise from plastic, to be precise by the injection-moulding process. Such throttle-valve housings consisting of plastic have the advantage that they are lighter than aluminium housings, that the production material is cheaper and that inserts, for example inserts provided with threaded bores or inserts designed as rolling-contact bearings for the mounting of the throttling member, can be pressed into openings formed during the injection-moulding operation, so that finishing can be reduced to a minimum. The disadvantage of such throttle-valve housings consisting of plastic is that they shrink during and after the injection-moulding and distort after demoulding and that, furthermore, they have poor dimensional stability under the effect of temperature and force. It must be taken into account here that the engine compartment of a motor vehicle, and therefore also the throttle-valve housing, is subject to large temperature fluctuations, since on the one hand extremely low temperatures can occur when the motor vehicle is left parked outside in the winter and on the other hand temperatures in excess of 120° C. can occur during the operation of the motor vehicle, in particular on hot summer days, and after the engine has been switched off. For these reasons, dimensional stability of the inside surface of such throttle-valve housings consisting of plastic is not insured. Such dimensional stability is necessary, however, in order that every position of the swivelling throttling member corresponds to a precisely defined throughflow cross-section and, in particular, in order that a minimum, precisely defined residual gap or complete shutting off in an end position of the throttling member is possible. For reasons of environmental protection and to reduce fuel consumption, nowadays very low idling speeds of the engine are required, the throttling member assuming an idling position in which only a small amount of air may flow past the throttling member. It is therefore particularly important that the inner wall surface of the throttle-valve housing maintains its dimensional stability even when operated for long periods over years, in particular in the region of the so-called idling position of the throttling member, in order to be able to set the required low gap width around the throttling member. It is further disadvantageous that the position and the axial alignment of the bearings for the throttling member also changes, for example due to the temperature fluctuations, which can result in jamming of the throttling member. If used in motor vehicles, jamming can have the effect that the engine speed and travelling speed can no longer be influenced by the driver.

In order to avoid these disadvantages, it has already been proposed to form an inner wall of the throttle-valve housing, at least in the region in which the circumference of the throttling member is in the direct proximity of this inner wall when in a corresponding swivelled position, as a fitting part of metal, whose surface facing the throttling member forms a dimensionally stable fitting surface. One disadvantage of this arrangement is that the production of this fitting part is expensive, in particular since the fitting surface must undergo precision finishing, to be precise either before this fitting part is connected to the throttle-valve housing consisting of plastic or after this operation. In addition, such a fitting part has a large volume.

The object of the present invention is to avoid the disadvantages of the known designs and provide a moulding consisting of plastic, for example a throttle-valve housing, of the type described at the beginning which can be produced simply and cheaply and the inner wall surface of which has the required dimensional stability.

To achieve this object, the invention proposes that in the wall there is arranged an insert, covered by plastic material at least on the inner wall surface facing the cavity. Since this insert is covered by plastic material on the side facing the inner wall surface, the said insert does not form a fitting part, so it is not necessary for this insert to undergo dimensionally accurate machining. Rather, the inner wall surface interacting with the throttling member and serving as a fitting surface is formed by plastic material and, if a suitable material is used, is already obtained after demoulding from the injection mould, so that the inner wall surface forming this fitting surface does not require any further machining.

It has been found that, if according to an advantageous embodiment of the invention it consists of metal, the insert forms a type of reinforcement of the plastic which prevents not only shrinking and distorting of the plastic material after demoulding but also ensures a high degree of temperature resistance of this plastic material.

Since the insert is covered by plastic material, at least on the side facing the cavity, advantageously on all sides, an accurate machining of this insert is not required during production of the same. This insert is advantageously shaped from a metal sheet, to be precise by punching in the progressive die process for example, whereby any desired shaping of the insert can be achieved.

According to a further advantageous development of the invention, the design according to the invention makes it possible for sections of the insert consisting of sheet metal to be bent out from an upper or lower sheet plane and for these bent-out sections to be used, for example, for strengthening the bearing points for the throttling member or other attachments by means of which for example a connection to other parts is established. These sections may be formed by annular parts which are embedded in the plastic material in the region of openings, in particular bearing openings, so that they reinforce or strengthen the plastic material in the region of these bearing openings.

The insert is expediently provided with deformations, in particular with openings penetrating them, through which openings the plastic is forced during production of the moulding by the injection-moulding process, whereby better fixing of the insert in the plastic material is achieved.

According to a further feature of the invention, the insert is advantageously likewise provided with attachments covered by plastic material. These attachments may have openings, which are formed for example as threaded openings, via which a connection to additional parts can be established by means of screws.

Figure 1:
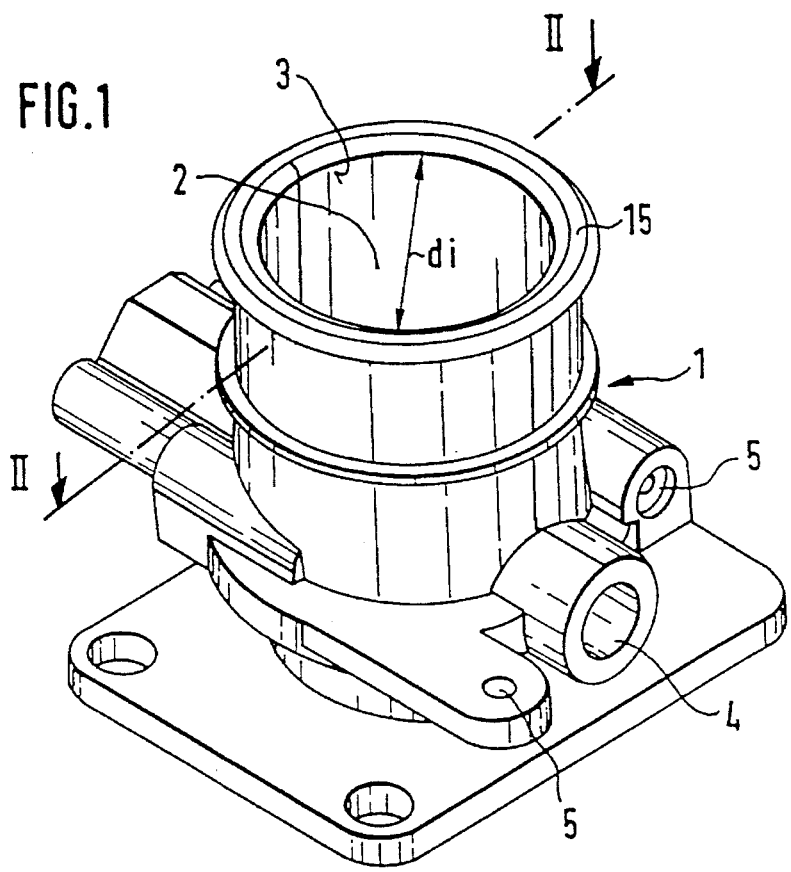
FIG. 1 shows a throttle-valve housing designed according to the invention in a perspective representation.
Figure 2:
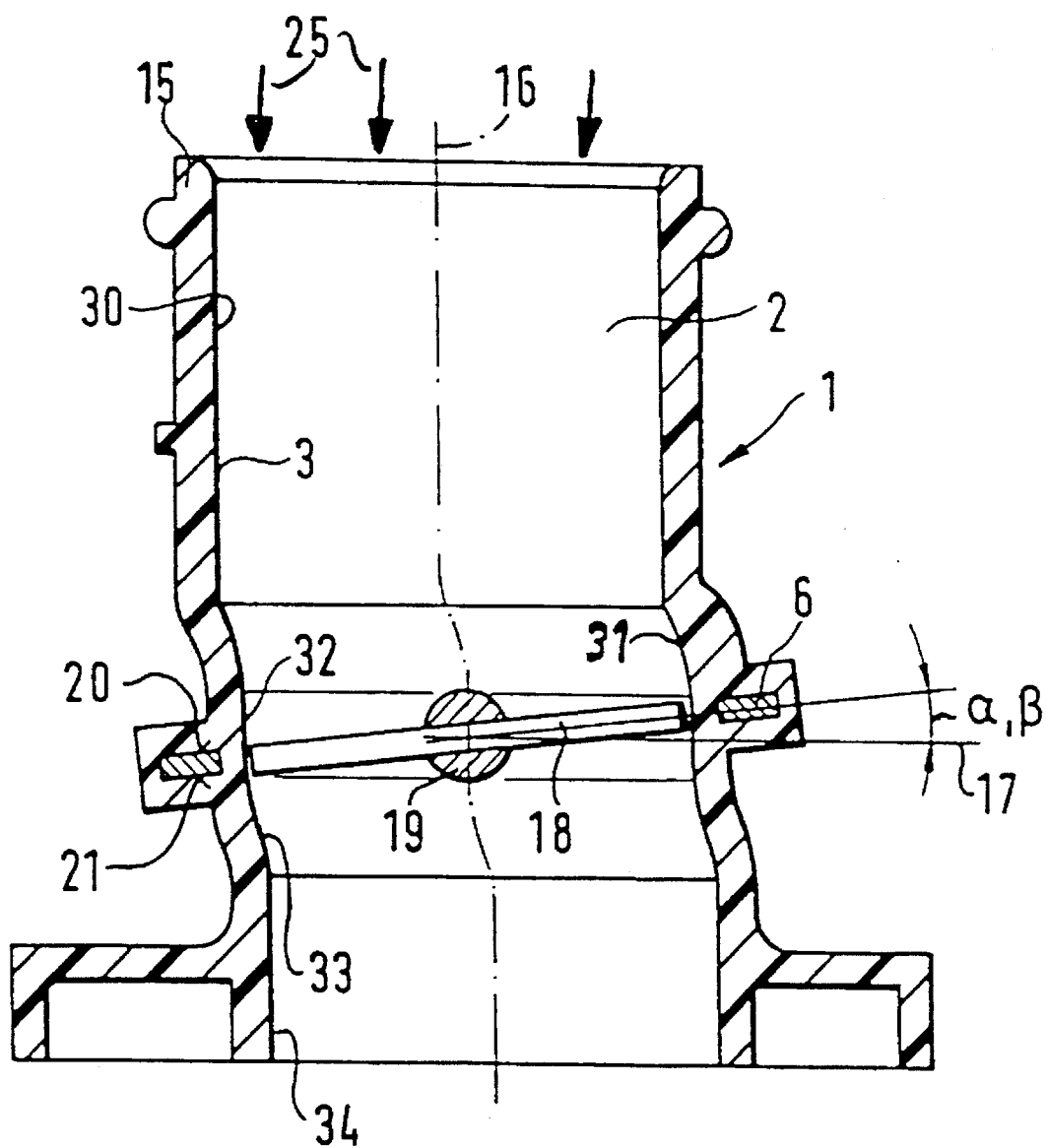
FIG. 2 shows a section through the throttle-valve housing along the line II—II in FIG. 1

Shown as an exemplary embodiment of the invention in FIGS. 1 and 2 is a throttle-valve housing 1 in known form, which consists of plastic and is produced by the injection-moulding process. This throttle-valve housing 1 is part of an air-intake pipe of an internal-combustion engine and has a cavity 2 of circular cross-section, which extends along a longitudinal axis 16 and the wall 15 of which, formed completely from plastic material, has on the inside an inner wall surface 3 which forms the fitting surface for a throttling member, which is designed for example as a disc-shaped throttle valve 18 and serves for controlling the power of the engine. The throttle valve 18 is fastened on a throttle-valve spindle 19, which is mounted in rolling-contact bearings or sliding bearings (not shown), which are pressed into the bearing openings 4 of the throttle-valve housing 1. Threaded openings 5 in the throttle-valve housing 1 serve for fastening additional components on the throttle-valve housing.

Seen in a direction of airflow marked by an arrow 25, the cavity 2 is made up of a cylindrical inflow section 30 of circular cross-section, an adjoining first transitional section 31, which likewise has circular cross-sections, which lie however along a longitudinal axis displaced arcuately to the right in FIG. 2, an adjoining cylindrical intermediate section 32 of circular cross-section, which merges with a second transitional section 33, which likewise has circular cross-sections which lie however along a longitudinal axis displaced arcuately to the right, and a cylindrical outflow section 34 of circular cross-section. The throttle-valve spindle 19 extends tranversely through the intermediate section 32, so that the throttle valve 18 is always inclined with respect to a normal plane 17 to the longitudinal axis 16 within the intermediate section 32 in the shut-off position of the said throttle valve when the engine is not running and also in its so-called idling position, in which the engine is running at idling speed and there is only an extremely small gap for the intake air between the circumference of the throttle valve 18 and the inner wall surface 3. The angle of inclination of the throttle valve 18 with respect to the normal plane 17 is between about 4° and 8° in the idling position, depending on the idling speed set and on the engine used.

As FIG. 2 reveals, in the region of the wall 15, approximately where the wall 15 encloses the intermediate section 32 and the throttle valve 18 is located in its shut-off position and idling position, there is an annular insert 6 embedded in the plastic material. The insert 6 is covered on all sides by the plastic material, at least towards the inner wall surface 3. The insert 6 forms in particular an angle of between about 4° and 8° with the normal plane 17 to the longitudinal axis 16 of the cavity 2. Particularly good dimensional accuracy and dimensional stability of the inner wall surface 3 has been obtained with the insert part 6 inclined at an angle $\alpha$ with respect to the normal plane 17 which is between 4° and 8° with respect to a normal plane 17 such that it runs in alignment with the throttle valve 18 in the idling position, that is to say that angles $\alpha$ and $\beta$ are equal. Not only metal is suitable as the material for the insert, but also plastic, ceramic, a composite or other material. In this case, bearings and bushes which have openings or threaded bores may already be connected to the insert 6.

Figure 3:
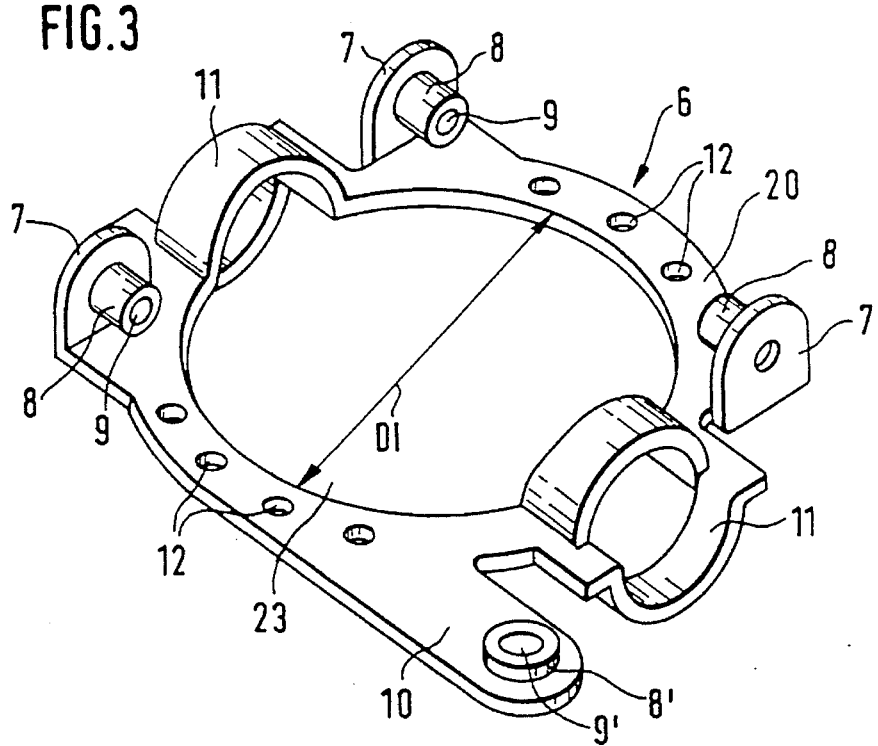
FIG. 3 shows a perspective representation of an insert.

The insert 6, which is shown in perspective representation in FIG. 3, comprises a metal sheet and is produced by the progressive die process, no importance having to be attached to particular dimensional accuracy and surface machining, since this insert 6 is in any case surrounded particularly completely by the plastic material. The inside diameter $D_i$ of a central opening 23 of the annular insert 6 is greater than the inside diameter $d_i$ of the cylindrical cavity 2 bounded by the inner wall surface 3. Openings 12 penetrating the insert 6 effect better anchoring of the same in the plastic material.

FIG. 3 likewise shows that the insert 6 has sections 7 which are bent out from an upper sheet plane 20 and a lower sheet plane 21 and are provided with passages 8 which have positioning openings 9 for the anchoring in the injection mould and the like. An attachment 10 extending along the sheet planes 20, 21 has a sleeve 8' with a threaded opening 9'. Bent out from the sheet planes 20, 21 are likewise annular parts 11, which are embedded in the plastic material in part-dish form in the region of the bearing openings 4 and thus form a dimensionally stable cage around the bearings to be pressed in.

The insert 6 with its sections 7 and attachments 10 and also its annular parts 11 forms a type of reinforcement of the plastic material and therefore a strengthening of the wall parts consisting of the plastic material at those points at which dimensional stability of this plastic material is particularly important, that is to say shrinking, distorting or the like is to be prevented, in particular even when temperature fluctuations occur. This insert 6 consequently effects a stabilization of the plastic material and ensures accuracy of the fit of the inner wall surface 3, although it consists of plastic material, which ensures reliable and accurate operation of the throttling member. That also the bearing openings 4 are strengthened by the annular parts 11, likewise forming part of the insert 6, achieves the effect that the bearing points for the throttling member also do not change, for example by changing temperature influences, so that the bearing position is retained and deformations which lead for example to a jamming of the throttling member are prevented. The insert 6 is placed into an injection mould prior to production of the throttle-valve housing and is secured there in a suitable way. After demoulding, no finishing of the throttle-valve housing is required.

The foregoing relates to preferred exemplary embodiments of the invention, it being understood that other variants and embodiments thereof are possible within the spirit and scope of the invention, the latter being defined by the appended claims.

We claim:

1. A throttle valve housing formed of molded plastic, said throttle-valve housing (1) having a wall (15) with an inner wall surface (3) which bounds a cavity (2), a metal insert (6) shaped from a metal sheet and molded within the wall (15) and covered by plastic material at least on the inner wall surface (3) facing the cavity (2) and said metal insert surrounds an area in which a throttle valve is supported.

2. A throttle valve housing according to claim 1, in which the cavity (2) has a longitudinal axis (16) and the insert (6) is inclined at an angle of inclination with respect to a normal plane (17) directed perpendicularly to the longitudinal axis.

3. A throttle valve housing according to claim 2, in which the angle of inclination α of the insert (6) is between about 4° and 8° with respect to the normal plane (17).

4. A throttle valve housing according to claim 2, in which the insert (6) is inclined with respect to the normal plane (17) in such a way that it runs in alignment with a swivelling throttle valve (18) which is arranged in the cavity (2) and serves for controlling the fuel intake of an internal-combustion engine in the idling position of the said throttle valve.

5. A throttle valve housing according to claim 3, in which the insert (6) is inclined with respect to the normal plane (17) in such a way that it runs in alignment with a swivelling throttle valve (18) which is arranged in the cavity (2) and serves for controlling the fuel intake of an internal-combustion engine in the idling position of the said throttle valve.

6. A throttle valve housing according to claim 1, in which the insert (6) has an upper sheet plane (20) and a lower sheet plane (21) and at least one section (7, 11) is bent out from one of said sheet planes (20, 21).

7. A throttle valve housing according to claim 1, in which the insert (6) is provided with deformations, with openings (12) penetrating said deformations.

8. A throttle valve housing according to claim 1, in which the insert (6) is provided with attachments (10).

9. A throttle valve housing according to claim 6, in which the sections of the insert (6) are formed by annular parts (11) which are embedded in the plastic material in a region of bearing openings (4) concentrically with respect to the said openings.

10. A throttle valve housing according to claim 6, in which the sections (7, 11) and/or the attachments (10) have openings (9, 9').

11. A throttle valve housing according to claim 8, in which the sections (7, 11) and/or the attachments (10) have openings (9, 9').

12. A throttle valve housing according to claim 8, in which the sections (7, 11) and/or the attachments (10) have openings (9, 9').

* * * * *